Oct. 25, 1960  H. G. COON  2,957,442
WHEEL-DIRECTION INDICATOR FOR AUTOMOBILES
Filed June 5, 1957
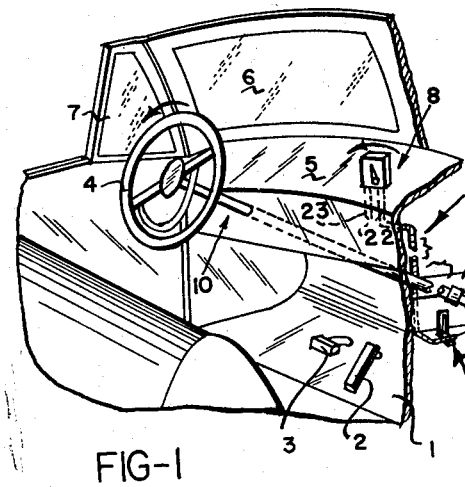
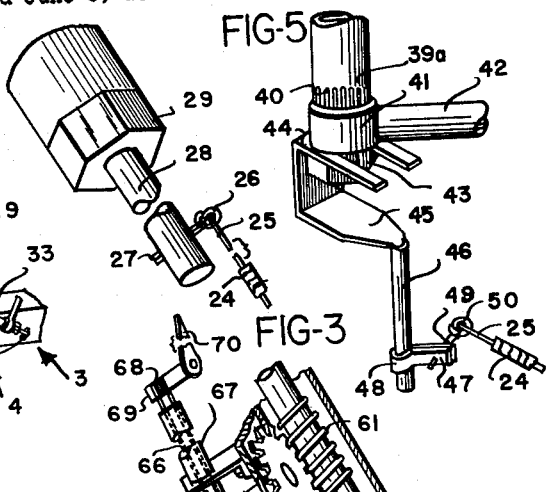
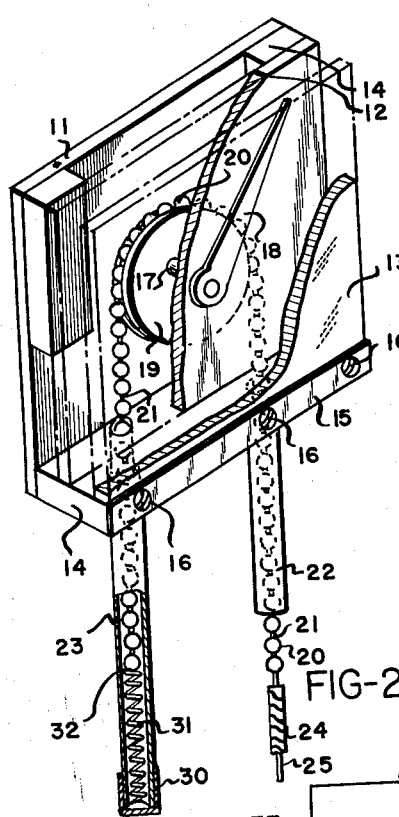
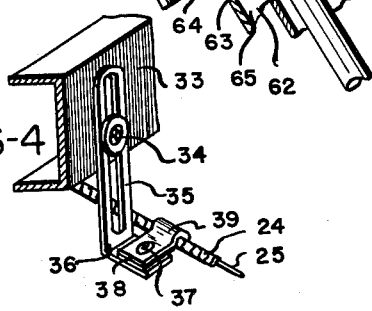
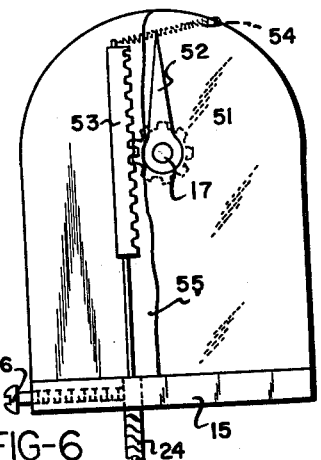
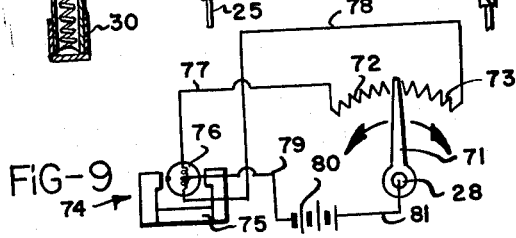
INVENTOR.
HERBERT G. COON
BY *Toulmin & Toulmin*
ATTORNEYS 2,957,442
Patented Oct. 25, 1960

2,957,442

WHEEL-DIRECTION INDICATOR FOR AUTOMOBILES

Herbert G. Coon, 1242 Mount Vernon Ave., Dayton, Ohio

Filed June 5, 1957, Ser. No. 663,776

2 Claims. (Cl. 116—31)

The present invention relates to an improved wheel direction indicator for automobiles.

In backing a car into a small parking space, it is customary to cut the front wheels to the right or left, depending upon the direction in which it is desired to have the rear end of the car move. The latter, having been properly parked, may then remain for a considerable time in the canted front wheel position. When the operator returns to his car, he will invariably fail to notice the direction in which the front wheels extend.

Consequently, as the car moves forward, the front wheels may have been turned so far on an angle as to cause the wheels to mount the curb, or if the cant of the wheels is in the other direction and not turned sharply enough, the car may not avoid striking the automobile in front.

These conditions are of course aggravated in the case of the inexperienced or impatient driver, particularly when maneuvering a large car and the parking space demands a severe cant of the wheels. It appears that the main difficulty resides in the fact that the operator, upon being seated in the car and not having any way of knowing the position of the wheels, either carelessly or from lack of experience, causes the car to move without placing the front wheels in proper direction to safely leave the parking space.

Again, some inexperienced drivers, even when knowing the direction in which the front wheels are canted, are not always able to translate this wheel direction into terms of the forward or rearward direction of movement of the car.

The primary object of the invention is to provide an inexpensive means for not only specifically indicating the inexpensive direction in which the wheels are pointed, but momentary direction in which the car will move either forwardly or rearwardly when the front wheels extend in that particular direction.

Another object is to provide an accurate wheel direction in a car movement indicator which may be viewed by the operator when seated in the driving position.

Still another object is to provide a wheel direction indicator which is located on the dash of the car and is directly connected with the mechanism that controls the direction in which the car moves, either forwardly or rearwardly.

Still another object is to provide an indicator of the character mentioned, in which there is a positive and non-slipping drive between the indicator-operating mechanism and the steering wheel.

A further object is to provide an improved wheel direction indicator in which the indications are synchronized with the movements of the steering wheel in order to minimize any false or inaccurate indications due to the wear of the parts associated with the steering mechanism.

Another object is to provide an improved wheel direction and car movement indicator, positioned within the body of the car, in plain view of the operator and in which the actuating device for the indicator is taken from a part of the steering mechanism that is remote from any part which vibrates or is otherwise caused to move due to irregularities of the road.

The invention will be better understood when reference is made to the following description and the accompanying drawings, in which:

Figure 1 is a fragmentary view, in perspective, of the improved wheel direction and car movement indicator as placed in position on the dash of the automobile;

Figure 2 is an enlarged perspective view, broken away, of the indicating dial and operating mechanism;

Figure 3 is a view of the lower end of the steering column showing one way of attaching the actuating mechanism of the indicator to the steering mechanism;

Figure 4 represents a perspective view of a hanger or support for the actuating wire;

Figure 5 shows still another form of support;

Figure 6 depicts a modified form of the indicator in which a tensioning spring is employed;

Figure 7 shows an indicator, similar to Figure 6, but employing a compression spring;

Figure 8 illustrates a different way of transferring motion from the steering shaft to the wheel direction indicator on the dash; while Figure 9 depicts an electrical form of actuator to transfer movements of the steering shaft to the indicator.

Referring more particularly to Figures 1, 2, 3 and 4, reference character 1 designates the front end of an automobile body with the gas pedal 2 and the brake pedal 3 in place together with a steering wheel 4, a dash 5, and front and side windshields 6 and 7 respectively. It will be understood that the steering wheel 4 is connected be understood that the steering wheel 4 is connected through a steering and sector shaft, a pitman arm and the necessary tie rods and springs to the front wheels (not shown), so that movement of the wheel 4 causes one of the front wheels to cant to the right or left and to force the other front wheel in the same direction through the usual radius or tie rod. By the term "steering shaft" I mean the shaft such as the element 28 shown in Figure 8 to which the steering wheel is connected. The term "sector shaft" means the shaft such as the element 39a in Figure 5 which carries the sector gear and to which the pitman arm is normally attached.

When it is necessary to park the car, particularly in a conventional metered parking space, which spaces are never too large, the operator finds, through experience, that it is easier to back the car into the parking space than to enter the latter in the forward direction. Quite often, considerable maneuvering is necessary to place the car at the proper distance between front and rear adjacent cars and yet be no more than the legal distance away from the curb and as a result, the car is usually left with its wheels in a canted, perhaps at an extreme angle before the maneuvering has been completed. The wheels may be directed inwardly or outwardly, as was found necessary, to effect the parking operation and, as is the more usual situation, the operator merely locks the car and walks away without observing the final position assumed by the front wheels.

When the operator later reenters the car, the wheel position, again, is not noticed so that when the car is given the gas and begins to move, the operator is often surprised to find that the car has either mounted the curb or else the cant of the wheels was not sufficient to avoid hitting the car in front.

While much of this disagreeable result is avoided by the more experienced drivers, i.e. by the feel of the steering wheel, nevertheless accidents of this type frequently occur and the more cramped the parking space, the more difficult it becomes to either park the car satisfactorily in that space or to remove the car safely out of the space.

Accordingly, I have devised a novel mechanism by which the operator is aided under these conditions by at least knowing, and without moving from the operator's seat, the exact direction in which the wheels are canted, and also the direction in which the car will move either forwardly or rearwardly when given the gas.

The improvement consists of a mechanical system of which the main parts are constituted of a dial, indicated generally by the reference character 8, an actuating wire shown generally at 9, and a mechanical connection to the sector or steering shaft indicated generally at 10, of which an enlarged view is illustrated in Figure 3. It will be noted that the dial device 8 is positioned and secured to the dash 5, although, if desired, the dial may be located within the panel of instruments.

The actuating wire 9 which serves as a connecting element for operating the dial is preferably contained in a protective tubing or conduit and the latter is sheltered from rain and from any unauthorized tampering by being contained within the hood or engine compartment of the car. This wire is connected to an extension of the sector shaft by a readily adaptable accessory, and in such a way that as the shaft is turned on the wheel 4, a pull is exerted on the actuating wire or cable for operating the needle of the indicator.

Details of the indicator

As shown in Figure 2, the indicator may comprise three square sheets of plastic material 11, 12, 13, pieces 11, 12 being spaced from one another by the separators 14 and screwed together (not shown), while all three of the pieces are spaced from one another at the bottom by means of a base member 14, also preferably made of plastic material. A plate 15 may be screwed, as indicated at 16, the screws extending through the base member 14 and bolted to the rear side of the plate 11.

Holes are provided at the center of the plates 11, 12 which serve as bearings for a metal shaft 17 having a retaining member at the plate 11, but extending through the plate 12 to carry a pointer 18. On this shaft and located between the plates 11, 12, there is a grooved pulley 19 which preferably has small circular indentations at the bottom of the groove which receive the ball portions 20 of a chain 21. The opposite lengths of the latter extend loosely through openings in the base member 14.

There is a pair of pipes 22, 23 extending downwardly from the member 14 and secured thereto in any suitable manner, the chain 21 passing up through one of these pipes and down through the other. These pipes 22, 23 extend through openings in the dash 5 and suitable threads are provided thereon (not shown) to receive nuts under the dash so as to hold the indicator 8 rigidly in a vertical position on the dash. However, if desired, and as stated hereinbefore, the indicator may be inserted and secured within the regular panel board on the dash.

The pipe 22 serves not only as a clamping support for the indicator but also as a guide for the chain 21. The latter, after leaving the pipe 22, passes through a flexible metal cable indicated at 24, the latter extending under the hood, and therefore in a protected position as far as the lower end of the steering shaft, as seen in Figure 3.

The actuating wire 25 extends beyond the metal cable 24 and is connected to a loop 26 (Figure 3) which terminates a long cotter-pin or rod 27 which is driven through a metal rod 28. The latter is provided with a nut 29 at its upper end and the inside threaded portion of the nut receives threads which are provided on an extension of the sector shaft. Thus, as the steering wheel 4 is turned, the nut 29 likewise rotates, and the arm 27 swings through an arc in such a direction as to apply a downward pull on the wire 25.

This wire moves longitudinally through the cable 24 and pulls the chain 21 that is contained in pipe 22 (Fig. 2) downwardly, and this causes the pulley or wheel 19 to rotate in a clockwise direction, as seen in this figure.

Thus, the pointer 18 is caused to swing through an arc to the right. In order to force the pointer 18 to move counter-clockwise, as when the wire 25 is forced upwardly due to a turn on the steering wheel 4 in the opposite direction, a spring tensioning device is provided within the pipe 23.

The lower end of this pipe is closed by means of a cap 30 and there is a spring 31 contained therein, one end of which is secured to the closed end of the cap 30, and the other end is secured to the lowermost ball 20 of the chain, as indicated at 32. The function of this spring is to keep the chain and the entire length of the cable 25 taut at all times, but more especially to actuate the pulley 19 in the counter-clockwise direction when the tension on the wire 25 is relieved at the shaft.

Thus, by turning the wheel 4 to the left or right, the pulley 19 will be caused to move in the corresponding direction and, inasmuch as the sector shaft of the steering wheel is connected through standard gearing, stub shafts and tie rods to one of the front wheels and the latter, in turn, is connected through a typical radius rod to the other front wheel, the movement of the steering wheel will not only actuate the front wheels in the usual manner, but will move the pointer to show at a glance as to the direction in which the front wheels are momentarily canted.

For example, when the pointer is in the position shown in Figure 2, this will indicate to the driver that the wheels are turned drastically to the right so that any movement of the car forward will cause the front end of the car to swing to the right. The pointer in this same position will also indicate that if the car were moving backward, the rear end of the car would likewise swing to the right. Thus, any climbing over the curb on the forward or backward movements of the car can be avoided.

The position of the pointer will also give the driver some indication as to the sharpness of the turn, either by the front or the rear end, that the car may take for a given cant of the wheels, and thus assist him in avoiding parked cars which have left only a short parking space between them.

Depending upon the type of car, it may be desirable to carry the cable 24 around obstructions under the hood and still permit the spring 31 to maintain the cable taut. For this purpose, various types of intermediate supports may be employed as shown, for example, in Figure 4. In this figure one of the struts of the metal frame of the car, as indicated at 33, and a thumb screw 34 is threaded into the strut. A slotted plate 35 slidably fits under the head of the thumb screw 34 so that as the latter is loosened, the plate can be moved to any height on account of the slot and when the screw is tightened, the plate is rigidly held in that position.

The plate has a short right-angle extension 36 at the bottom to which may be secured, as by a screw 37, a double thickness plate 38 having an eyelet 39. This eyelet tightly grasps the cable 24 and when the plate 35 is adjusted to its proper height and transverse position, the cable is held against movement or vibration and the minimum friction is offered to the wire 25 which passes through the cable.

While I have shown perhaps the most practical way of transferring the rotary effort of the sector shaft 28 to a pulling effort on the wire 25 as the steering wheel is rotated in Figure 3, there are other ways of accomplishing this result, in accordance with my invention. In Figure 5 the lower end of a sector shaft 39a is normally provided with a short grooved portion 40 for receiving the terminating ring 41 of a pitman arm 42. This ring is held tight on the shaft by means of a nut 43. The structure described up to this point in regard to Figure 5 is standard design in many types of cars. In order to apply my invention, it is merely necessary to unloosen the nut 43 and then to insert a slotted U-shaped member 44 forming part of my improved direction-indicating accessory, after which the nut can be tightened and all parts held securely in place. As shown in Fig. 5, the slot of said member is sufficiently large to permit the forked portion to slide over the grooved end of the shaft so that the tightening of the nut 43 serves to press the member 44 against the ring 41 of the pitman arm.

The portion 44 forms part of a rectangularly shaped member 45 of sheet metal which terminates in a downwardly (or angularly) extending rod 46. Thus the member 45 serves as a crank element, the center of rotation coinciding with the center of the sector shaft 39a, and as this element is swung when the sector shaft is rotated, the pin 46 is likewise caused to move in an arcuate path. The latter may carry the folded band member 47 having an eyelet 48 which tightly embraces the rod 46. A pin 49 may be driven into the band member 47 and has an eyelet 50 to which the lower end of the wire 25 can be secured.

Thus, as the sector shaft 39a is turned in response to turning the steering wheel 4, not only will the tie rod 42 which controls the front wheels be moved in the proper direction, but also the member 45 will be simultaneously rotated to cause a pulling down effort on the wire 25. The latter, in turn, will cause the pointer 18 to swing in the manner stated hereinbefore.

Figure 6 shows a modified form of actuator for the pointer within the indicator and in which a small rack and gear are employed. The gear 51 and the pointer 52 are mounted on the shaft 17 and meshing with this gear there is a vertical rack 53, the upper end of which is held against the gear by means of a tension spring 54. This spring also serves to apply a constant upward pull on the rack 53 and thus to maintain the actuating cable taut. The lower end of the rack is carried by a rod 55 which extends through the base 14 and is connected to the wire 25.

A screw 56 may extend through the base 14 to hold the protective cable 24 in place, through which the wire 25 extends. Thus, a pull downwardly on the wire 25 will draw the rack 53 downwardly and swing the pointer 52 to the left, and an upward movement of the wire 25 will drive the rack 53 upward to move the pointer to the right in accordance with the rotation of the sector shaft 28 and thus indicate the angular position of the front wheels.

Instead of having a tension spring 54 for maintaining the wire 25 taut, I may employ a compression spring 57 contained in a pipe 58 which is secured, as indicated at 59, to the base 14 of the indicator. The rod 55 extending from the lower end of the rack 53 is provided with a washer 60 which sets on the spring 57 and the wire continues through the spring and is secured to the actuator wire 25 contained in the cable 24.

Thus, the spring 57 will continuously push the rack 53 upwardly and maintain the wire 25 sufficiently taut that there is little or no backlash in transferring the movement of the lower end of the sector shaft 28 to the swinging movement of the pointer. Extreme accuracy of movement is therefore assured in indicating the momentary angular position of the front wheels in terms of the movement of the steering wheel 4.

Figure 8 shows still another way in which the movement of the sector shaft can be transferred to the swinging pointer 18. The shaft can be readily provided in a standard car with a sleeve having thereon a worm gear 61 at a position directly under the dash. Any mechanic can remove the steering wheel of the present-day car and slide this tight-fitting sleeve over the sector shaft to any desired position. A slot can then be cut in the steering column or cover 62 to receive a gear 63 which is suitably mounted on a shaft 64.

A U-shaped shield 65 may be provided about the gear, the shaft 64 projecting beyond the shield to leave a miniature pulley about which a small string-like belt can be wound, as indicated at 66, contained within a protective tube 67. This belt can be wrapped around a shaft 69 suitably supported within the indicator, and a dial 70 secured at the end of the shaft. Thus, as the shaft 28 is rotated by the steering wheel, the gear 63 and the shaft 64 are turned to rotate the shaft 69 which, in turn, causes the pointer 70 to swing to the right or left in the manner and for the purpose described hereinbefore.

Figure 9 shows an all-electric system for carrying the movement of the sector shaft 28 to the pointer of the indicator. In this case, the base of the shaft 28 is provided with an arm 71 which, in swinging to the left or right, makes contact with the turns of two separate resistors 72, 73. A small servo-motor is generally indicated at 74, having a permanent field 75 and a split winding armature 76. The extreme ends of the armature are connected through wires 77, 78 to the resistor 72, 73 respectively and the mid-tap of the armature winding is connected through a wire 79, through a battery 80, which may be the car battery, and grounded through the conductor 81.

A pointer (not shown) is secured to the end of the armature shaft, so that when the sector shaft 28 is rotated, the energy from the battery 80 flows through one or the other half of the armature winding and thus the armature shaft carrying the pointer is swung either right or left, depending upon the direction of rotation of the sector shaft 28. It is obvious that, if desired, suitable reduction gears can be employed between the armature shaft and the pointer shaft.

The wires 77, 78, 79 are taken through a conduit of insulating material from the position of the resistors 72, 73 to the reversible motor 74 which may be located directed under the dash-board and a shaft extending upwardly into the indicator to actuate the pointer.

From the foregoing, it is evident that I have disclosed a novel type of wheel direction indicator which also determines the direction in which either the front or the rear end of the car will move and which indicator is actuated by various kinds of accessories which can be manufactured and bought either as standard equipment or as a package, through auto supply stores. The indicator is located inside the car where the operator can readily view the same without turning his head and, finally, the movements of the indicator are obtained from that part of the steering mechanism, namely the sector shaft, which is not subject to excessive vibration and is remote from tie rods and other parts that seem to accumulate excessive mud during rainy weather.

There is no backlash or lost movement between the movement of the steering wheel and the movement of the pointer of the indicator, in view of the presence of the various springs and devices furnished for adjustment in the position of the cable, so that even relatively small movements of the sector or steering shaft are faithfully translated into the swinging movements of the pointer, so that the latter will reflect accurately the position of the front wheels.

Various parts, including the indicator plates, the racks 53, the pipes 22, 32, the shields 65, the gear 63, the worm sleeve 61, the U-shaped member 45 and its shaft 46, and the slotted plate 35 can all be made of plastic materials, if desired, instead of metal, as also the pulley 19 so that the parts, as a whole, are inexpensive to make and for the most part can be supplied on existing cars by ordinary mechanics.

It will be understood that various modifications and arrangements in structure could be made without departing from the spirit of my invention and, accordingly, I desire to comprehend such modifications and substitutions of equivalents as may be considered to come within the scope of the appended claims.

I claim:

1. A wheel-direction indicator adapted to be applied to an automobile, said indicator being positioned in the proximity of the steering wheel, said means including a steering shaft, a sector shaft, and an elongated connector extending between said indicator and said sector shaft, said last mentioned shaft being adapted to carry a pitman arm secured thereto by a fastening device, said connector terminating in a member which is adapted to be secured directly to said sector shaft by said fastening device.

2. A wheel-direction indicator adapted to be applied to an automobile, said indicator being positioned in the proximity of the steering wheel and having means for driving actuation from said wheel, said means including a steering shaft and a sector shaft connected therewith, a pitman arm embracing said sector shaft and secured thereto by a headed bolt, and a cable extending between said indicator and said sector shaft, said cable terminating in a U-shaped member which is adapted to embrace said bolt and is detachably held in position by the head of said bolt pressing against said pitman arm.

References Cited in the file of this patent

UNITED STATES PATENTS

| | | |
|---|---|---|
| 1,165,186 | Leap | Dec. 21, 1915 |
| 1,471,209 | Rooney et al. | Oct. 16, 1923 |
| 1,653,744 | Stensaeter | Dec. 27, 1927 |
| 2,175,637 | Pauli | Oct. 10, 1939 |
| 2,707,451 | Brink | May 3, 1955 |
| 2,711,525 | Kelley | June 21, 1955 |
| 2,736,003 | Hastings | Feb. 21, 1956 |

FOREIGN PATENTS

| | | |
|---|---|---|
| 449,577 | Great Britain | June 30, 1936 |